US011339730B2

(12) United States Patent
Maier

(10) Patent No.: US 11,339,730 B2
(45) Date of Patent: May 24, 2022

(54) SYSTEMS AND METHODS FOR IMPROVING FUEL ECONOMY OF INTERNAL COMBUSTION ENGINES

(71) Applicant: dynaCERT Inc., Toronto (CA)

(72) Inventor: Olivia Maier, Toronto (CA)

(73) Assignee: dynaCERT Inc., Toronto (CA)

( * ) Notice: Subject to any disclaimer, the term of this patent is extended or adjusted under 35 U.S.C. 154(b) by 0 days.

(21) Appl. No.: 17/050,892

(22) PCT Filed: Mar. 20, 2019

(86) PCT No.: PCT/CA2019/050339
§ 371 (c)(1),
(2) Date: Oct. 27, 2020

(87) PCT Pub. No.: WO2019/204901
PCT Pub. Date: Oct. 31, 2019

(65) Prior Publication Data
US 2021/0231066 A1 Jul. 29, 2021

Related U.S. Application Data

(60) Provisional application No. 62/663,383, filed on Apr. 27, 2018.

(51) Int. Cl.
*F02D 41/00* (2006.01)
*F02D 19/08* (2006.01)
(Continued)

(52) U.S. Cl.
CPC ....... *F02D 41/0025* (2013.01); *F02D 19/081* (2013.01); *F02D 19/0644* (2013.01); *F02D 19/0671* (2013.01); *F02M 25/12* (2013.01)

(58) Field of Classification Search
CPC . F02M 25/12; F02D 19/0671; F02D 19/0644; F02D 19/081; F02D 41/0025
See application file for complete search history.

(56) References Cited

U.S. PATENT DOCUMENTS 3,672,341 A 6/1972 Smith et al.
3,809,743 A 5/1974 Unland et al.
(Continued)

FOREIGN PATENT DOCUMENTS

AU 2015218446 A1 3/2017
CA 1113037 A 11/1981
(Continued)

OTHER PUBLICATIONS

International Search Report and Written Opinion dated May 6, 2019 in International Patent Application No. PCT/CA2019/050339 (17 pages).
(Continued)

*Primary Examiner* — Kevin A Lathers
(74) *Attorney, Agent, or Firm* — Bereskin & Parr LLP/S.E.N.C.R.L., s.r.l.

(57) ABSTRACT

The various embodiments disclosed herein relate to systems and methods of improving fuel economy of internal combustion engines. In particular, the systems and methods relate to improving fuel economy of internal combustion engines by increasing the laminar flame speed (LFS) of fuel and hydrogen gas mixture. By increasing the laminar flame speed of the mixture, amount of carbon-based fuel that undergoes combustion increases. This may provide the advantage of minimizing overall fuel consumption by the engine, resulting in fuel savings. This may also provide the advantage of minimizing greenhouse gas emissions by the engine, resulting in environmental benefits.

20 Claims, 6 Drawing Sheets

(51) Int. Cl.
  *F02D 19/06* (2006.01)
  *F02M 25/12* (2006.01)

(56) References Cited

U.S. PATENT DOCUMENTS

| | | | |
|---|---|---|---|
| 3,862,624 | A | 1/1975 | Underwood |
| 4,028,208 | A | 6/1977 | Giacopelli |
| 4,111,160 | A | 9/1978 | Talenti |
| 4,112,875 | A | 9/1978 | Laumann et al. |
| 4,369,737 | A | 1/1983 | Sanders et al. |
| 4,392,937 | A | 7/1983 | Schmitt et al. |
| 4,403,645 | A | 9/1983 | MacCracken |
| 4,442,801 | A | 4/1984 | Glynn et al. |
| 4,727,930 | A | 3/1988 | Bruckner et al. |
| 4,784,700 | A | 11/1988 | Stern et al. |
| 5,105,773 | A | 4/1992 | Cunningham et al. |
| 5,450,822 | A | 9/1995 | Cunningham |
| 6,332,434 | B1 | 12/2001 | De Souza et al. |
| 7,398,644 | B2 | 7/2008 | Leone et al. |
| 7,819,091 | B2 | 10/2010 | Sego |
| 7,832,197 | B2 | 11/2010 | Leone |
| 7,861,520 | B2 | 1/2011 | Broderick et al. |
| 8,186,315 | B2 | 5/2012 | Jeffs et al. |
| 8,691,070 | B1 | 4/2014 | Burkett et al. |
| 9,695,760 | B2 | 7/2017 | Dufford |
| 9,732,646 | B2 | 8/2017 | Upadhyay |
| 10,253,685 | B2 | 4/2019 | Alexander et al. |
| 10,400,687 | B2 | 9/2019 | Bridge et al. |
| 2001/0003276 | A1 | 6/2001 | De Souza et al. |
| 2003/0024489 | A1 | 2/2003 | Balan et al. |
| 2006/0090712 | A1 | 5/2006 | Ehresman |
| 2006/0180101 | A1 | 8/2006 | Monette |
| 2007/0042244 | A1 | 2/2007 | Spallone et al. |
| 2007/0044455 | A1* | 3/2007 | Barasa ............. F01N 3/035 60/295 |
| 2007/0209365 | A1 | 9/2007 | Hamer et al. |
| 2008/0017137 | A1 | 1/2008 | VanHoose et al. |
| 2008/0302670 | A1 | 12/2008 | Boyle |
| 2010/0175941 | A1 | 7/2010 | Khodabakhsh |
| 2010/0183931 | A1 | 7/2010 | Hedman |
| 2011/0086280 | A1 | 4/2011 | Roustaei |
| 2011/0094456 | A1 | 4/2011 | Dee |
| 2011/0094459 | A1 | 4/2011 | Dee et al. |
| 2011/0174241 | A1 | 7/2011 | McConahay et al. |
| 2011/0185990 | A1 | 8/2011 | Inwald |
| 2011/0203917 | A1 | 8/2011 | Shmueli et al. |
| 2011/0253070 | A1 | 10/2011 | Haring |
| 2011/0303194 | A1 | 12/2011 | Fong et al. |
| 2012/0111734 | A1 | 5/2012 | Kramer |
| 2012/0298054 | A1 | 11/2012 | Dinsmore |
| 2013/0037003 | A1 | 2/2013 | Sheerin |
| 2013/0071317 | A1 | 3/2013 | Lee |
| 2013/0127245 | A1 | 5/2013 | Kruger |
| 2013/0174797 | A1 | 7/2013 | Owens |
| 2013/0276726 | A1* | 10/2013 | Owens ............. F02M 25/12 123/3 |
| 2014/0261303 | A1 | 9/2014 | McAlister |
| 2014/0262819 | A1 | 10/2014 | Forbes et al. |
| 2014/0290595 | A1 | 10/2014 | Owens |
| 2015/0040844 | A1 | 2/2015 | Goldman et al. |
| 2015/0101926 | A1 | 4/2015 | Burns |
| 2015/0226113 | A1* | 8/2015 | Alexander ......... F02D 41/0002 123/3 |
| 2015/0275787 | A1 | 10/2015 | Dufford et al. |
| 2016/0201533 | A1 | 7/2016 | Upadhyay et al. |
| 2016/0369688 | A1 | 12/2016 | Hamad et al. |
| 2017/0159556 | A1 | 6/2017 | Owens |
| 2017/0298811 | A1 | 10/2017 | Santillo et al. |
| 2019/0176639 | A1 | 6/2019 | Kumar et al. |

FOREIGN PATENT DOCUMENTS

| | | |
|---|---|---|
| CA | 2412367 A1 | 5/2004 |
| CA | 2449538 A1 | 5/2005 |
| CA | 2546166 A1 | 5/2005 |
| CN | 101255832 A | 9/2008 |
| CN | 101975108 A | 2/2011 |
| DE | 102011000655 A1 | 8/2011 |
| GB | 1263881 A | 2/1972 |
| GB | 2073317 A | 10/1981 |
| GB | 2461375 A | 1/2010 |
| GB | 2479404 A | 10/2011 |
| JP | 2007-085203 A | 4/2007 |
| RU | 2446294 C2 | 3/2012 |
| WO | 2007/130571 A2 | 11/2007 |
| WO | 2008/154721 A1 | 12/2008 |
| WO | 2011/027309 A2 | 3/2011 |
| WO | 2011/031763 A1 | 3/2011 |
| WO | 2011/124921 A1 | 10/2011 |
| WO | 2011/127583 A1 | 10/2011 |
| WO | 2013/138915 A1 | 9/2013 |
| WO | 2014/110295 A2 | 7/2014 |
| WO | 2015/057284 A2 | 4/2015 |
| WO | 2016/064289 A1 | 4/2016 |

OTHER PUBLICATIONS

Non-final Office Action and Notice of References Cited dated Dec. 7, 2017 in U.S. Appl. No. 14/423,602 (15 pages).
International Search Report and Written Opinion dated Dec. 11, 2017 in International Patent Application No. PCT/CA2017/051145 (7 pages).
International Search Report and Written Opinion dated Dec. 17, 2013 in International Patent Application No. PCT/CA2013/000737 (8 pages).
International Preliminary Report on Patentability dated Feb. 24, 2015 in International Patent Application No. PCT/CA2013/000737 (6 pages).
International Search Report and Written Opinion dated Jul. 8, 2011 in International Patent Application No. PCT/CA2011/000421 (9 pages).
International Preliminary Report on Patentability dated Oct. 16, 2012 in International Patent Application No. PCT/CA2011/000421 (6 pages).
Restriction Requirement dated Nov. 10, 2014 in U.S. Appl. No. 13/641,005 (6 pages).
Search Report dated Jun. 17, 2014 in CN Patent Application No. 201180023927.1 (1 page—English translated).
First Office Action dated Jun. 27, 2014 in CN Patent Application No. 201180023927. 1 (18 pages with English translation).
International Search Report and Written Opinion dated Jul. 10, 2013 in International Patent Application No. PCT/CA2013/000273 (8 pages).
International Preliminary Report on Patentability dated Sep. 23, 2014 in International Patent Application No. PCT/CA2013/000273 (5 pages).
Final Office Action and Notice of References Cited dated Nov. 25, 2016 in U.S. Appl. No. 14/423,602 (15 pages).
Office Action and Search Report dated Jul. 23, 2020 in RU Patent Application No. 2019114033 (28 pages with English translation).
Non-final Office Action and Notice of References Cited dated May 30, 2018 in U.S. Appl. No. 15/298,783 (22 pages).
Notice of Allowance and Notice of References Cited dated May 2, 2019 in U.S. Appl. No. 15/298,783 (9 pages).
Non-Final Office Action and Notice of References Cited dated Aug. 18, 2020 in U.S. Appl. No. 16/514,543 (10 pages).
Extended European Search Report dated Apr. 28, 2020 in EP Patent Application No. 17862395.5 (9 pages).

* cited by examiner

SYSTEMS AND METHODS FOR IMPROVING FUEL ECONOMY OF INTERNAL COMBUSTION ENGINES

FIELD

The described embodiments relate to systems and methods for improving fuel economy of internal combustion engines, and in particular, to systems and methods for improving fuel economy of internal combustion engines by increasing the laminar flame speed of fuel and hydrogen gas mixture.

BACKGROUND

Conventional internal combustion engines typically used in trucks and cars tend to be inefficient, consume a lot of fuel and generate a lot of greenhouse gases and other harmful emissions, such as carbon monoxide, unburned hydrocarbons, nitrous oxides and particulate matter. There is a need to improve the operation of internal combustion engines in order to address the growing requirements to reduce emissions and provide an overall increase in fuel economy.

SUMMARY

In one aspect, in at least one embodiment described herein, there is provided a fuel management system. The system comprises an internal combustion engine configured to combust a carbon-based fuel supplied by a fuel supply; a reactor system configured to electrolytically disassociate a substrate to generate hydrogen gas and oxygen gas, the hydrogen gas and the oxygen gas being provided to the internal combustion engine prior to the combustion of the carbon-based fuel via an air intake passage; and a control system coupled to the reactor system and the internal combustion engine, the control system being configured to control a percentage of combustion of the carbon-based fuel in a fuel-gas mixture comprising the carbon-based fuel, the hydrogen gas and the oxygen gas based on a laminar flame speed of the fuel-gas mixture, where the percentage combustion of the carbon-based fuel is correlated to the laminar flame speed of the fuel-gas mixture according to:

$$\% \text{ fuel combustion with } x\% \text{ H2 gas} = \frac{\text{laminar flame speed of the fuel-gas mixture}}{\text{engine stroke speed}},$$

$$\text{wherein engine stroke speed} = \frac{\text{engine stroke length}}{\left(\frac{1 \text{ rotation}}{2 \text{ strokes}}\right)},$$
$$\text{engine RPM}$$

wherein the engine stroke length is a length of a piston stroke of the internal combustion engine.

In some embodiments, the control system is configured to determine the laminar flame speed of the fuel-gas mixture according to:

laminar flame speed of fuel-gas mixture=[(z×[x%])+ (y×[1−x%])], wherein x is a predetermined amount of the hydrogen gas mixed with the carbon-based fuel, y is a laminar flame speed of the carbon-based fuel (in m/s) and z is a laminar flame speed of hydrogen gas (in m/s).

In some embodiments, the carbon-based fuel is diesel, and the control system is configured to determine the laminar flame speed of the diesel-gas mixture according to:

laminar flame speed of diesel-gas mixture=[(4.4× [x%])+(0.3×[1−x%])], wherein x is a predetermined amount of the hydrogen gas mixed with the carbon-based fuel, y is 0.3 m/s and z is 4.4 m/s.

In some other embodiments, the carbon-based fuel is gasoline, and the control system is configured to determine the laminar flame speed of the gasoline-gas mixture according to:

laminar flame speed of gasoline-gas mixture=[(4.4× [x%])+(0.45×[1−x%])], wherein x is a predetermined amount of the hydrogen gas mixed with the carbon-based fuel, y is 0.45 m/s and z is 4.4 m/s.

In various embodiments, the control system is configured to determine a percentage of combustion of the carbon-based fuel in the fuel-gas mixture according to:

$$\% \text{ fuel combustion with } x \% \text{ H2 gas} = \left[\frac{1}{\text{engine stroke length}}\right] \times [(z \times [x\%]) + (y \times [1-x\%])] \times \left[\frac{\left(\frac{1 \text{ rotation}}{2 \text{ Strokes}}\right)}{\text{engine RPM}}\right],$$

wherein x is a predetermined amount of the hydrogen gas mixed with the carbon-based fuel, y is a laminar flame speed of the carbon-based fuel (in m/s) and z is a laminar flame speed of hydrogen gas (in m/s).

In some embodiments, the carbon-based fuel is diesel, and the control system is configured to determine the percentage of combustion of diesel in the diesel-gas mixture according to:

$$\% \text{ diesel combustion with } x \% \text{ H2 gas} = \left[\frac{1}{\text{engine stroke length}}\right] \times [(4.4 \times [x\%]) + (0.3 \times [1-x\%])] \times \left[\frac{\left(\frac{1 \text{ rotation}}{2 \text{ Strokes}}\right)}{\text{engine RPM}}\right],$$

wherein x is a predetermined amount of the hydrogen gas mixed with the carbon-based fuel, y is 0.3 m/s and z is 4.4 m/s.

In some embodiments, the control system is configured to determine a mass balance for the percentage combustion of the carbon-based fuel according to:

$C_{12}H_{23}+zO_2 \rightarrow aCO_2+bCO+cH_2O$ wherein:
a=[% diesel combustion with x % H2 gas]×12;
b=12−a;
c=11.5; and
z=0.5(2a+b+c).

In some other embodiments, the carbon-based fuel is gasoline, and the control system is configured to determine the percentage of combustion of gasoline fuel in the gasoline-gas mixture according to:

$$\text{\% gasoline combustion with } x \text{ \% H2 gas} = \left[\frac{1}{\text{engine stroke length}}\right] \times [(4.4 \times [x\ \%]) + (0.45 \times [1 - x\ \%])] \times \left[\frac{\left(\frac{1 \text{ rotation}}{2 \text{ Strokes}}\right)}{\text{engine RPM}}\right],$$

wherein x is a predetermined amount of the hydrogen gas mixed with the carbon-based fuel, y is 0.45 m/s and z is 4.4 m/s.

In another aspect, in at least one embodiment described herein, there is provided a fuel management system. The system comprises an internal combustion engine configured to combust a carbon-based fuel supplied by a fuel supply; a reactor system configured to electrolytically disassociate a substrate to generate hydrogen gas and oxygen gas, the hydrogen gas and the oxygen gas being provided to the internal combustion engine prior to the combustion of the carbon-based fuel via an air intake passage; and a control system coupled to the reactor system and the internal combustion engine, the control system being configured to determine a percentage of combustion of the carbon-based fuel in a mixture comprising the carbon-based fuel, the hydrogen gas and the oxygen gas according to:

$$\text{\% fuel combustion with } x \text{ \% H2 gas} = \left[\frac{1}{\text{engine stroke length}}\right] \times [(z \times [x\%]) + (y \times [1 - x\ \%])] \times \left[\frac{\left(\frac{1 \text{ rotation}}{2 \text{ Strokes}}\right)}{\text{engine RPM}}\right],$$

wherein x is a predetermined amount of the hydrogen gas mixed with the carbon-based fuel in the mixture, y is a laminar flame speed of the carbon-based fuel (in m/s), z is a laminar flame speed of hydrogen gas (in m/s) and engine stroke length is a length of a piston stroke of the internal combustion engine.

In some embodiment, where the carbon-based fuel is diesel, the control system is configured to determine the percentage of combustion of diesel in a mixture comprising the diesel, the hydrogen gas and the oxygen gas according to:

$$\text{\% diesel combustion with } x\% \text{ H2 gas} = \left[\frac{1}{\text{engine stroke length}}\right] \times [(4.4 \times [x\%]) + (0.3 \times [1 - x\%])] \times \left[\frac{\left(\frac{1 \text{ rotation}}{2 \text{ Strokes}}\right)}{\text{engine RPM}}\right],$$

wherein x is a predetermined amount of the hydrogen gas mixed with the carbon-based fuel in the mixture, y is 0.3 m/s, z is 4.4 m/s and engine stroke length is a length of a piston stroke of the internal combustion engine.

In some other embodiments, where the carbon-based fuel is gasoline, the control system is configured to determine the percentage of combustion of gasoline in a mixture comprising the gasoline-based fuel, the hydrogen gas and the oxygen gas according to:

$$\text{\% gasoline combustion with } x \text{ \% H2 gas} = \left[\frac{1}{\text{engine stroke length}}\right] \times [(4.4 \times [x\ \%]) + (0.3 \times [1 - x\ \%])] \times \left[\frac{\left(\frac{1 \text{ rotation}}{2 \text{ Strokes}}\right)}{\text{engine RPM}}\right],$$

wherein x is a predetermined amount of the hydrogen gas mixed with the carbon-based fuel in the mixture, y is 0.45 m/s, z is 4.4 m/s and engine stroke length is a length of a piston stroke of the internal combustion engine.

In a further aspect, in at least one embodiment described herein, there is provided a method of operating a fuel management system, the fuel management system comprising an internal combustion engine configured to combust a carbon-based fuel supplied by a fuel supply, the fuel management system also comprising a reactor system configured to electrolytically disassociate a substrate to generate hydrogen gas and oxygen gas, the hydrogen gas and the oxygen gas being provided to the internal combustion engine prior to the combustion of the carbon-based fuel via an air intake passage, and the fuel management system additionally comprising a control system coupled to the internal combustion engine and the reactor system, the control system including a processor and a memory coupled to the processor and configured to store instructions executable by the processor, the method comprising: receiving a predetermined percentage of hydrogen gas value at the processor, the predetermined percentage of hydrogen gas value representing a percentage of hydrogen gas in a fuel-gas mixture of the carbon-based fuel, hydrogen gas and the oxygen gas provided to the internal combustion engine for combustion; and determining, by the processor, a percentage of combustion of the carbon-based fuel in the fuel-gas mixture, wherein the percentage combustion of the carbon-based fuel is correlated to the laminar flame speed of the fuel-gas mixture according to:

$$\text{\% diesel combustion with } x \text{ \% H2 gas} = \frac{\text{laminar flame speed of the fuel--gas mixture}}{\text{engine stroke speed}},$$

$$\text{where in engine stroke speed} = \frac{\text{engine stroke length}}{\frac{\left(\frac{1 \text{ rotation}}{2 \text{ Strokes}}\right)}{\text{engine RPM}}},$$

wherein the engine stroke length is a length of a piston stroke of the internal combustion engine.

In some embodiments, the method comprises determining, by the processor, the laminar flame speed of the fuel-gas mixture according to:

$$\text{laminar flame speed of fuel--gas mixture} = [(z \times [x\%]) + (y \times [1 - x\%])],$$

wherein x is a predetermined amount of the hydrogen gas mixed with the carbon-based fuel, y is a laminar flame speed of the carbon-based fuel (in m/s) and z is a laminar flame speed of hydrogen gas (in m/s).

In some embodiments, the method comprises determining, by the processor, a percentage of combustion of the carbon-based fuel in the fuel-gas mixture according to:

$$\% \text{ fuel combustion with } x \% \text{ H2 gas} = \left[\frac{1}{\text{engine stroke length}}\right] \times$$

$$[(z \times [x \ \%]) + (y \times [1 - x \ \%])] \times \left[\frac{\left(\frac{1 \text{ rotation}}{2 \text{ Strokes}}\right)}{\text{engine RPM}}\right],$$

wherein x is a predetermined amount of the hydrogen gas mixed with the carbon-based fuel, y is a laminar flame speed of the carbon-based fuel (in m/s) and z is a laminar flame speed of hydrogen gas (in m/s).

In some embodiments, where the carbon-based fuel is diesel, the method comprises determining, by the processor, the percentage of combustion of diesel in the diesel-gas mixture according to:

$$\% \text{ diesel combustion with } x \% \text{ H2 gas} = \left[\frac{1}{\text{engine stroke length}}\right] \times [(4.4 \times [x \ \%]) +$$

$$(0.3 \times [1 - x \ \%])] \times \left[\frac{\left(\frac{1 \text{ rotation}}{2 \text{ Strokes}}\right)}{\text{engine RPM}}\right]$$

wherein x is a predetermined amount of the hydrogen gas mixed with the carbon-based fuel in the mixture, y is 0.3 m/s, z is 4.4 m/s.

In some embodiments, the method comprises determining, by the processor, a mass balance for the percentage combustion of the carbon-based fuel according to:

$$C_{12}H_{23} + zO_2 \rightarrow aCO_2 + bCO + cH_2O$$

wherein:
a=[% diesel combustion with x % H2 gas]×12;
b=12−a;
c=11.5; and
z=0.5(2a+b+c).

In some other embodiments, where the carbon-based fuel is gasoline, the method comprises determining, by the processor, the percentage of combustion of gasoline in the gasoline-gas mixture according to:

$$\% \text{ gasoline combustion with } x \% \text{ H2 gas} = \left[\frac{1}{\text{engine stroke length}}\right] \times [(4.4 \times [x \ \%]) +$$

$$(0.45 \times [1 - x \ \%])] \times \left[\frac{\left(\frac{1 \text{ rotation}}{2 \text{ Strokes}}\right)}{\text{engine RPM}}\right]$$

wherein x is a predetermined amount of the hydrogen gas mixed with the carbon-based fuel in the mixture, y is 0.45 m/s, z is 4.4 m/s.

In another aspect, in at least one embodiment described herein, there is provided a method of operating a fuel management system, the fuel management system comprising an internal combustion engine configured to combust a carbon-based fuel supplied by a fuel supply, the fuel management system also comprising a reactor system configured to electrolytically disassociate a substrate to generate hydrogen gas and oxygen gas, the hydrogen gas and the oxygen gas being provided to the internal combustion engine prior to the combustion of the carbon-based fuel via an air intake passage, and the fuel management system additionally comprising a control system coupled to the internal combustion engine and the reactor system, the control system including a processor and a memory coupled to the processor and configured to store instructions executable by the processor, the method comprising: receiving a predetermined percentage of hydrogen gas value at the processor, the predetermined percentage of hydrogen gas value representing a percentage of hydrogen gas in a fuel-gas mixture of the carbon-based fuel, hydrogen gas and the oxygen gas provided to the internal combustion engine for combustion; and determining, by the processor, a percentage of combustion of the carbon-based fuel in the fuel-gas mixture according to:

$$\% \text{ fuel combustion with } x \% \text{ H2 gas} = \left[\frac{1}{\text{engine stroke length}}\right] \times [(z \times [x \ \%]) +$$

$$(y \times [1 - x \ \%])] \times \left[\frac{\left(\frac{1 \text{ rotation}}{2 \text{ Strokes}}\right)}{\text{engine RPM}}\right],$$

wherein x is a predetermined amount of the hydrogen gas mixed with the carbon-based fuel in the mixture, y is a laminar flame speed of the carbon-based fuel (in m/s), z is a laminar flame speed of hydrogen gas (in m/s) and engine stroke length is a length of a piston stroke of the internal combustion engine.

In some embodiments, the carbon-based fuel is diesel, and the method comprises determining, by the processor, the percentage of combustion of diesel in a mixture comprising the diesel, the hydrogen gas and the oxygen gas according to:

$$\% \text{ diesel combustion with } x \% \text{ H2 gas} = \left[\frac{1}{\text{engine stroke length}}\right] \times [(4.4 \times [x \ \%]) +$$

$$(0.3 \times [1 - x \ \%])] \times \left[\frac{\left(\frac{1 \text{ rotation}}{2 \text{ Strokes}}\right)}{\text{engine RPM}}\right],$$

wherein x is a predetermined amount of the hydrogen gas mixed with the carbon-based fuel in the mixture, y is 0.3 m/s, z is 4.4 m/s and engine stroke length is a length of a piston stroke of the internal combustion engine.

In some other embodiments, the carbon-based fuel is gasoline, and the method comprises determining, by the processor, the percentage of combustion of gasoline in a mixture comprising the gasoline-based fuel, the hydrogen gas and the oxygen gas according to:

$$\% \text{ gasoline combustion with } x \% \text{ H2 gas} = \left[\frac{1}{\text{engine stroke length}}\right] \times [(4.4 \times [x \ \%]) +$$

$$(0.45 \times [1 - x \ \%])] \times \left[\frac{\left(\frac{1 \text{ rotation}}{2 \text{ Strokes}}\right)}{\text{engine RPM}}\right],$$

wherein x is a predetermined amount of the hydrogen gas mixed with the carbon-based fuel in the mixture, y is 0.45 m/s, z is 4.4 m/s and engine stroke length is a length of a piston stroke of the internal combustion engine.

Other features and advantages of the present application will become apparent from the following detailed description taken together with the accompanying drawings. It should be understood, however, that the detailed description and the specific examples, while indicating preferred embodiments of the application, are given by way of illustration only.

BRIEF DESCRIPTION OF THE DRAWINGS

For a better understanding of the various embodiments described herein, and to show more clearly how these various embodiments may be carried into effect, reference will be made, by way of example, to the accompanying drawings which show at least one example embodiment and the figures will now be briefly described.

Figure 1:
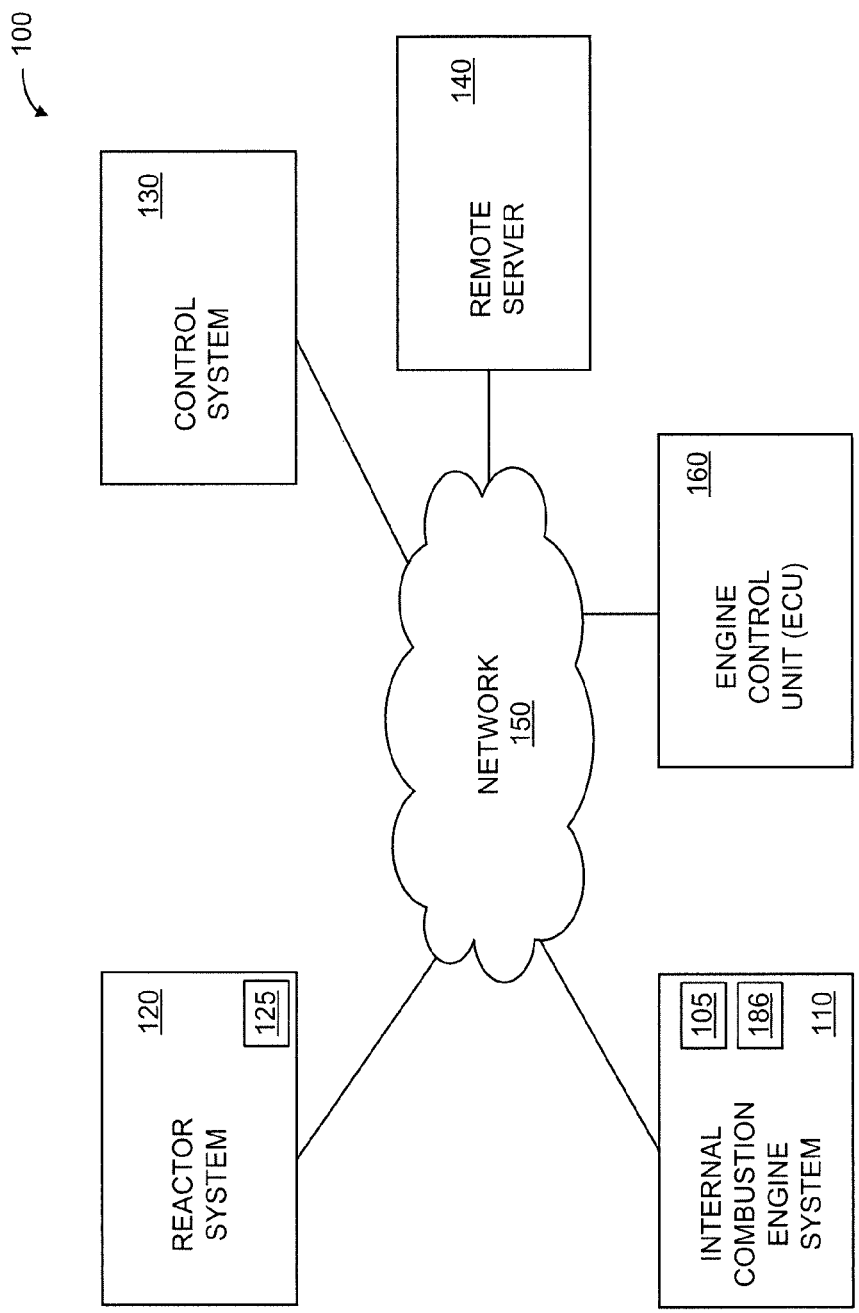
FIG. 1 is an example of a block diagram of a fuel management system.

The skilled person in the art will understand that the drawings, described below, are for illustration purposes only. The drawings are not intended to limit the scope of the applicants' teachings in anyway. Also, it will be appreciated that for simplicity and clarity of illustration, elements shown in the figures have not necessarily been drawn to scale. For example, the dimensions of some of the elements may be exaggerated relative to other elements for clarity. Further, where considered appropriate, reference numerals may be repeated among the figures to indicate corresponding or analogous elements.

DESCRIPTION OF VARIOUS EMBODIMENTS

Various apparatuses or processes will be described below to provide an example of at least one embodiment of the claimed subject matter. No embodiment described below limits any claimed subject matter and any claimed subject matter may cover processes, apparatuses, devices or systems that differ from those described below. The claimed subject matter is not limited to apparatuses, devices, systems or processes having all of the features of any one apparatus, device, system or process described below or to features common to multiple or all of the apparatuses, devices, systems or processes described below. It is possible that an apparatus, device, system or process described below is not an embodiment of any claimed subject matter. Any subject matter that is disclosed in an apparatus, device, system or process described below that is not claimed in this document may be the subject matter of another protective instrument, for example, a continuing patent application, and the applicants, inventors or owners do not intend to abandon, disclaim or dedicate to the public any such subject matter by its disclosure in this document.

Furthermore, it will be appreciated that for simplicity and clarity of illustration, where considered appropriate, reference numerals may be repeated among the figures to indicate corresponding or analogous elements. In addition, numerous specific details are set forth in order to provide a thorough understanding of the example embodiments described herein. However, it will be understood by those of ordinary skill in the art that the example embodiments described herein may be practiced without these specific details. In other instances, well-known methods, procedures and components have not been described in detail so as not to obscure the example embodiments described herein. Also, the description is not to be considered as limiting the scope of the example embodiments described herein.

It should also be noted that the terms "coupled" or "coupling" as used herein can have several different meanings depending in the context in which the term is used. For example, the term coupling can have a mechanical or electrical connotation. For example, as used herein, the terms "coupled" or "coupling" can indicate that two elements or devices can be directly connected to one another or connected to one another through one or more intermediate elements or devices via an electrical element, electrical signal or a mechanical element such as but not limited to, a wire or a cable, for example, depending on the particular context.

It should be noted that terms of degree such as "substantially", "about" and "approximately" as used herein mean a reasonable amount of deviation of the modified term such that the end result is not significantly changed. These terms of degree should be construed as including a deviation of the modified term if this deviation would not negate the meaning of the term it modifies.

Furthermore, the recitation of any numerical ranges by endpoints herein includes all numbers and fractions subsumed within that range (e.g. 1 to 5 includes 1, 1.5, 2, 2.75, 3, 3.90, 4, and 5). It is also to be understood that all numbers and fractions thereof are presumed to be modified by the term "about" which means a variation up to a certain amount of the number to which reference is being made if the end result is not significantly changed.

The various embodiments of the devices, systems and methods described herein may be implemented using a combination of hardware and software. These embodiments may be implemented in part using computer programs executing on programmable devices, each programmable device including at least one processor, an operating system, one or more data stores (including volatile memory or non-volatile memory or other data storage elements or a combination thereof), at least one communication interface and any other associated hardware and software that is necessary to implement the functionality of at least one of the embodiments described herein. For example, and without limitation, the computing device may be a server, a network appliance, an embedded device, a computer expansion module, a personal computer, a laptop, a personal data assistant, a cellular telephone, a smart-phone device, a tablet computer, a wireless device or any other computing device capable of being configured to carry out the methods described herein. The particular embodiment depends on the application of the computing device.

In some embodiments, the communication interface may be a network communication interface, a USB connection or another suitable connection as is known by those skilled in the art. In other embodiments, the communication interface may be a software communication interface, such as those for inter-process communication (IPC). In still other embodiments, there may be a combination of communication interfaces implemented as hardware, software, and a combination thereof.

In at least some of the embodiments described herein, program code may be applied to input data to perform at least some of the functions described herein and to generate output information. The output information may be applied to one or more output devices, for display or for further processing.

At least some of the embodiments described herein that use programs may be implemented in a high level procedural or object oriented programming and/or scripting language or both. Accordingly, the program code may be written in C, Java, SQL or any other suitable programming language and may comprise modules or classes, as is known to those skilled in object oriented programming. However, other programs may be implemented in assembly, machine language or firmware as needed. In either case, the language may be a compiled or interpreted language.

The computer programs may be stored on a storage media (e.g. a computer readable medium such as, but not limited to, ROM, magnetic disk, optical disc) or a device that is readable by a general or special purpose computing device. The program code, when read by the computing device, configures the computing device to operate in a new, specific and predefined manner in order to perform at least one of the methods described herein.

Furthermore, some of the programs associated with the system, processes and methods of the embodiments described herein are capable of being distributed in a computer program product comprising a computer readable medium that bears computer usable instructions for one or more processors. The medium may be provided in various forms, including non-transitory forms such as, but not limited to, one or more diskettes, compact disks, tapes, chips, and magnetic and electronic storage. In alternative embodiments the medium may be transitory in nature such as, but not limited to, wire-line transmissions, satellite transmissions, internet transmissions (e.g. downloads), media, digital and analog signals, and the like. The computer useable instructions may also be in various formats, including compiled and non-compiled code.

The various embodiments disclosed herein relate to systems and methods of improving fuel economy of internal combustion engines. The term 'fuel economy' used herein refers to the overall cost of using fuel in a specific instance. The overall cost of using fuel in a vehicle can be determined based on various factors, such as, overall amount of fuel consumed by the vehicle, environmental effect of greenhouse gas emissions as a result of fuel use in the vehicle, opportunity cost of using non-renewable resources instead of alternative renewable resources etc.

In various embodiments discussed herein, the systems and methods relate to improving the fuel economy of internal combustion engines by increasing the laminar flame speed (LFS) of fuel and hydrogen gas mixture. By increasing the laminar flame speed of the mixture, the amount of carbon-based fuel that undergoes combustion increases. This may provide the advantage of minimizing fuel consumption by the engine, resulting in fuel savings. This may also provide the advantage of minimizing greenhouse gas emissions by the engine, resulting in environmental benefits.

Reference is first made to FIG. 1, illustrating a fuel management system 100 according to an example embodiment. The fuel management system 100 comprises an internal combustion engine system 110, a reactor system 120, a control system 130, a remote server 140 and an engine control unit ("ECU") 160. In some cases, the remote server 140 and the engine control unit 160 are optional components.

As illustrated, the internal combustion engine system 110 includes an internal combustion engine 105 that operates on carbon-based fuels. The internal combustion engine system 110 is configured to receive hydrogen and oxygen gases from the reactor system 120, and inject these gases into the air intake stream of the engine 105.

In some embodiments, the internal combustion engine system 110 includes an electronic control module ("ECM") 186 for monitoring the operating parameters of the engine 105. Some non-limiting examples of engine parameters that are monitored by the ECM 186 include odometer information, engine speed, fuel consumption, fuel rate, mass air pressure, mass air flow, mileage, distance, fuel rate, exhaust temperature, $NO_x$ levels, $CO_2$ levels, $O_2$ levels, engine instantaneous fuel economy, engine average fuel economy, engine inlet air mass flow rate, engine demand percent torque, engine percent load at current speed, transmission actual gear ratio, transmission current gear, engine cylinder combustion status, engine cylinder knock level, after treatment intake $NO_x$ level preliminary failure mode identifier (FMI), drivetrain information, vehicle speed and GPS location, etc.

The engine parameters monitored by the ECM 186 may consist of independent variables that may be measured directly from the engine 105 (or other parts of the vehicle) using sensors etc. The engine parameters may also include dependent variables that may be calculated or otherwise determined based on independent variables and optionally other information. In some cases, the same variable can be both an independent variable and a dependent variable based on the applicable time period. For example, the variable 'engine load' is an independent variable when the instantaneous engine load is determined. However, the same variable 'engine load' is a dependent variable when averaged over a trip.

Table 1 below provides a list of non-limiting examples of engine parameters, including independent and dependent variables, corresponding to the internal combustion engine 105:

TABLE 1

Internal Combustion Engine and Vehicle Parameters
Internal Combustion Engine and Vehicle Parameters

| Independent Variables | Input | Dependent Variables | Input |
|---|---|---|---|
| Drive Engine Load | I/A | Fuel Economy | I/A |
| Percentage Time at Load | A | Fuel Consumption | I/A |
| Overall Engine Load | A | BFSC (if available) | I/A |
| RPM | I/A | Power Generation per BTU | I/A |
| Percentage Time at RPM | A | Brake Specific | -I/A |
| Speed | I/A | Fuel Consumption ("BSFC") | |
| Vehicle Speed Limit | Y/N | Thermal Efficiency | -I/A |
| Trip Miles Travelled | I/A | | |
| Odometer Mileage | I | | |
| Idle | Y/N | | |
| Idle Percentage | A | | |
| % EGR | I/A | | |
| Oxygen Levels | I/A | | |

TABLE 1-continued

Internal Combustion Engine and Vehicle Parameters
Internal Combustion Engine and Vehicle Parameters

| Independent Variables | Input | Dependent Variables | Input |
|---|---|---|---|
| Diesel Particulate Regeneration | Y/N | | |
| Ambient Air Temperature | I/A | | |

Key:
I = Instantaneous;
A = Average or Trip;
Y = Yes;
M = Mountains;
S = Summer Fuel;
W = Winter Fuel;
F = Flat;
H = Hilly;
N = No In some cases, the engine data from the ECM 186 can be obtained via a transponder connected to the on-board diagnostics (OBD) port of the engine. The transponder may be connected to the OBD port using protocols such as J1939, ISO 15765-4 etc. Engine parameters received from the ECM 186 via the OBD port can be used by the control system 130 to determine the performance of the internal combustion engine 105.

In cases where the internal combustion engine system 110 does not include an ECM 186 or the ECM 186 does not provide the necessary data, the internal combustion engine system 110 may include other sensors or devices connected to the engine 105 or other parts of the vehicle in order to monitor engine parameters. Engine parameters received from these sensors or devices can be used by the control system 130 to determine the performance of the internal combustion engine 105.

Reactor system 120 includes an on-demand electrolytic reactor 125 for generating hydrogen and oxygen gases to be injected into the internal combustion engine 105 within the internal combustion engine system 110. In most cases, the reactor system 120 accesses a source of pure or substantially pure water for generating hydrogen and oxygen gases. The source of water may include on-board or local, on-demand water electrolysis devices (wet or dry technology) or bulk storage or any other such source.

In some cases, the reactor system 120 includes one or more sensors for monitoring the operating parameters of the electrolytic reactor 125. Some non-limiting examples of reactor parameters that are monitored by the sensors may include water tank level, electrolyte level, supplied electrical voltage, supplied electrical current, water tank temperature, reactor temperature, reactor leakage, water pump, gas flow, relative humidity, conductivity of electrolyte, resistance of electrolyte, and concentration of electrolyte.

In various cases, the reactor system 120 is configured to provide one or more reactor parameters to the control system 130, and in return, receive instructions from the control system 130 to control the operation of the reactor system 120. For example, in some cases, the control system 130 may instruct the reactor system 120 to generate specific volumes of the hydrogen and oxygen gases. In some other cases, the control system 130 may provide instructions to control the voltage, current and/or temperature, etc. of the reactor 125 in order control the amounts of hydrogen and oxygen gases produced by the reactor system 120.

In some cases, the reactor system 120 includes a reactor control board ("RCB"). The RCB may be any circuit board that is configured to regulate the operation of the reactor 125 in response to the instructions received from the control system 130. For example, the RCB is configured to regulate the operation of the reactor in response to reactor performance level determined by the control system 130 by modifying at least one of electrical current supplied to the reactor, electrical voltage supplied to the reactor and temperature of the reactor.

The fuel management system 100 may also include an engine control unit ("ECU") 160. The ECU 160 is coupled to the ECM 186 and other sensors provided within the engine 105 and other parts of the vehicle to monitor the operation of the engine 105. The ECU 160 is also configured to receive engine parameters from the ECM 186 and/or other sensors within the vehicle. In some cases, the ECU 160 is configured to determine the engine performance level for a given duration of time ("current engine performance level") based on the received engine parameters and measurements corresponding to that duration of time.

In addition, the ECU 160 is coupled to the plurality of sensors located in the reactor system 120. ECU 160 is also configured to receive the reactor parameters from the reactor system 120, and accordingly determine the reactor performance level for a given duration of time ("current reactor performance level") based on the received reactor parameters and measurements corresponding to that duration of time. The ECU 160 is also configured to determine the amount of hydrogen and oxygen gases generated by the reactor system 120 for any given duration of time based on the corresponding reactor parameters received by the ECU 160.

In some cases, the ECU 160 is further coupled to one or more other sources of data, e.g. one or more sensors, one or more user interfaces to receive user-inputs etc., to receive other relevant information about the operation of the engine 105. For example, the ECU 160 may be coupled to data sources to receive data such as, type of carbon-based fuel used in the engine 105, gross vehicle weight, GPS positioning data, wind data, accelerometer data, engine load, etc.

In various cases, the ECU 160 is configured to determine the ideal reactor performance level for a given duration of time based on the engine parameters and measurements received by the ECU 160 for that duration of time. The ECU 160 may alternatively determine the ideal reactor performance level for a given duration of time based on the engine performance level determined by the ECU 160 for that duration of time.

In such cases, the ECU 160 is also configured to determine the difference between the current reactor performance level for a particular duration of time and the ideal reactor performance level for the same time duration. The ECU 160 is then configured to generate instructions for the reactor system 120 to control the operation of the reactor 125 to minimize the difference between the ideal reactor performance level and the current reactor performance level.

The fuel management system 100 also includes a control system 130 coupled to the internal combustion engine system 110 and reactor system 120 via network 150. Network 150 may be any network(s) capable of carrying data including the Internet, Ethernet, plain old telephone service (POTS) line, public switch telephone network (PSTN), integrated services digital network (ISDN), digital subscriber line (DSL), coaxial cable, fiber optics, satellite, mobile, wireless (e.g. Wi-Fi, WiMAX), SS7 signaling network, fixed line, local area network, wide area network, and others, including any combination of these. Network 150 may also include a storage medium, such as, for example, a CD ROM, a DVD, an SD card, an external hard drive, a USB drive, etc.

In some cases, the ECU 160 is an optional element, and the control system 130 is configured to perform the functionalities disclosed above with reference to the ECU 160. For example, in some cases, the ECU 160 is configured to receive and relay engine parameters and reactor parameters received by the ECU 160. In such cases, the control system 130 is configured to process the received parameters and determine current engine performance level, current reactor performance level and ideal reactor performance level as discussed above. In another example, the control system 130 receives the engine parameters and the reactor parameters directly from the ECM 186 and/or sensors provided in the internal combustion engine system 110, reactor system 120 or elsewhere in the vehicle.

In some cases, the fuel management system 100 also includes a remote server system 140. In cases where the ECU 160 or the control system 130 are not able to access engine parameters from the internal combustion engine system 110, the control system 130 communicates with the remote server system 140 to access third party databases to determine measurements for some or all engine parameters discussed above for engines similar to engine 105 of FIG. 1 in size, capacity, fuel type etc.

In some cases, the control system 130 is configured to manage the operation of the reactor system 120 based on the determined current and ideal reactor performance level. The control system 130 is configured to control the electrolysis process carried out by the reactor system 120 in order to control the amount, including volumes, of hydrogen and oxygen gases generated by the reactor system 120 to be provided to the internal combustion engine system 110. The control system 130 is configured to do so by controlling one or more parameters of reactor 125, such as voltage supplied to the reactor 125, current supplied to the reactor 125, temperature of the reactor 125, etc.

In at least one embodiment, the control system 130 is configured to determine the laminar flame speed of a mixture of hydrogen gas, oxygen gas and carbon-based fuel used in the engine 105. In particular, since oxygen does not combust, the control system is actually configured to determine the laminar flame speed of the mixture of hydrogen gas and the carbon-based fuel (fuel-gas mixture). The laminar flame speed of the mixture of the hydrogen gas and the carbon-based fuel is based on the percentage of composition of $H_2/O_2$ gas in the mixture.

The control system 130 analyzes the determined laminar flame speed, and determines if the laminar flame speed of the fuel-gas mixture need to be increased. If so, the control system 130 triggers the reactor system 120 to increase the generation of hydrogen and oxygen gases by the reactor 125. The control system 130 controls the operation of the reactor system 120 to regulate the generation of hydrogen and oxygen gases in desired volumes.

By increasing the laminar flame speed of the fuel-gas mixture, the percentage of fuel combustion increases resulting in reduction of greenhouse gas emissions and overall fuel consumption. The control system 130 is configured to determine the percentage of fuel combustion by the engine 105 based on the ratio of the laminar flame speed of the fuel-gas mixture to the engine stroke speed, as shown in formula (1). The engine stroke speed represents the amount of fuel that burns before the engine completes a stroke, and it may be determined by the control system 130 based on formula (2). The engine stroke length is an indication of how far the piston travels in the cylinder of the internal combustion engine:

$$\% \text{ fuel combustion with } x \% H_2 \text{ gas} = \frac{\text{laminar flame speed of the fuel–gas mixture}}{\text{engine stroke speed}} \quad (1)$$

$$\text{engine stroke speed} = \frac{\text{engine stroke length}}{\left(\frac{1 \text{ rotation}}{2 \text{ strokes}}\right)} \quad (2)$$
$$\text{engine RPM}$$

In various embodiments illustrated herein, the control system 130 is configured to determine the laminar flame speed of the fuel-gas mixture based on formula (3), where variable 'z' is the laminar flame speed of hydrogen gas (expressed in units m/s), and 'y' is the laminar flame speed of the carbon-based fuel (expressed in units m/s) mixed in the fuel-gas mixture.

$$\text{LFS of fuel-gas mixture} = [(z \times [x\%]) + (y \times [1 - x\%])] \quad (3)$$

The carbon-based fuel can be any combustible liquid chemical. Some non-limiting examples of carbon-based fuels include diesel, gasoline, natural gas, butane, methane, ethanol, bio-diesel etc. Some non-limiting examples of laminar flame speeds of certain carbon-based fuels are provided in Table 2:

TABLE 2

Laminar flame speeds of certain carbon-based fuels

| Carbon-based Fuel | Laminar Flame Speed (sL) |
|---|---|
| Gasoline | 0.45 m/s at atmospheric pressure and 85 degree Celsius |
| Heptane | 0.37 m/s at atmospheric pressure and 25 degree Celsius |
| Acetylene | 1.2 m/s at atmospheric pressure and 25 degree Celsius |

The variable 'y' representing the laminar flame sped of the carbon-based fuel can be a dynamic variable that varies based on certain factors. Some non-limiting examples of such factors include fuel type, fuel structure, air-fuel ratio (i.e. the amount of air the fuel is burned with and the composition of that air), temperature, pressure etc. The laminar flame speed of a carbon-based fuel is directly proportional to the temperature, such that the increase in the temperature increase the laminar flame speed of the fuel. For example, the laminar flame speed of octane gas is 0.32 m/s at 25 degree Celsius, and it increases to 0.42 m/s at 85 degree Celsius.

The laminar flame speed of a carbon-based fuel is inversely proportional to the pressure in that the laminar flame speed of a carbon-based fuel decreases as the pressure increases, or vice versa. For example, the laminar flame speed of methane gas is 0.35 m/s at 1 atmospheric pressure, and decreases to around 0.15 m/s at 10 atmospheric pressure.

In most cases, the maximum flame speed occurs when the air-fuel ratio is equal to the stoichiometric ratio (i.e., the ratio defined by a balanced chemical formula). For example, the stoichiometric ratio for toluene to oxygen is 1:9, at which point the laminar flame speed of toluene is 0.35 m/s (at atmospheric pressure and 25 degree Celsius). When the air-fuel ratio is increased or decreased by 20%, the laminar flame speed of toluene is 0.3 m/s.

The control system 130 is also configured to determine the ideal amount of hydrogen gas ("target hydrogen amount") to be provided in a fuel-gas mixture to maximize the percentage of fuel consumption in the internal combustion engine 105. The control system 130 determines the target hydrogen amount based on formula (4) shown below, where 'x' represents the target hydrogen amount, 'y' represents the laminar flame speed of the subject fuel and 'z' represents the laminar flame speed of hydrogen gas, where the mixture of the carbon-based fuel and the hydrogen gas is undergoing combustion in an oxygen enriched environment:

$$\% \text{ combustion of carbon}- \text{based fuel with } x \% \text{ H}_2 \text{ gas} = \left[\frac{1}{\text{engine stroke length}}\right] \times [(z \times [x \%]) + (y \times [1 - x \%])] \times \left[\frac{\left(\frac{1 \text{ rotation}}{2 \text{ Strokes}}\right)}{\text{engine RPM}}\right] \quad (4)$$

In some cases, the control system 130 uses the above-noted equation (4) to determine the percentage of fuel combustion by an internal combustion engine 105 when a predetermined amount of hydrogen gas, represented by variable 'x' in equation (4), is provided in the fuel-gas mixture.

The various teachings disclosed here are further illustrated by way of an example. In some cases, the carbon-based fuel used in the engine 105 is diesel, and the laminar flame speed of diesel is typically 0.3 m/s. In such cases, the control system 130 is configured to trigger the operation of the reactor system 140 to generate enough hydrogen and oxygen gases so that the hydrogen gas additive to the diesel burns in an oxygen-enriched environment and the laminar flame speed of the diesel-gas mixture becomes greater than 4.4 m/s. The control system 130 is configured to determine the laminar flame speed (LFS) of the diesel-gas mixture based on the following formula (5), where x represents the percentage of the hydrogen gas in the diesel-gas mixture:

$$\text{LFS of diesel-gas mixture} = [(4.4 \times [x\%]) + (0.3 \times [1 - x\%])] \quad (5)$$

In at least one embodiment, where the carbon-based fuel used in the internal combustion engine 105 is diesel, the control system 130 is configured to determine the ideal amount of hydrogen gas that should be provided in the diesel-gas mixture to maximize the percentage of diesel combustion based on formula (4) above. In particular, where a predetermined percentage of diesel combustion is known, and the target amount of hydrogen gas to be provided in the diesel-gas mixture is to be determined, the control system 130 uses the following equation (6), where x represents the target amount of hydrogen gas to be provided in the diesel-gas mixture and the laminar flame speed of diesel (y) is assumed to be 0.3 m/s:

$$\% \text{ diesel combustion with } x \% \text{ H}_2 \text{ gas} = \left[\frac{1}{\text{engine stroke length}}\right] \times [(4.4 \times [x \%]) + (0.3 \times [1 - x \%])] \times \left[\frac{\left(\frac{1 \text{ rotation}}{2 \text{ strokes}}\right)}{\text{engine RPM}}\right] \quad (6)$$

In another example, where the carbon-based fuel used in the internal combustion engine 105 is gasoline, the control system 130 is configured to determine the laminar flame speed of the gasoline-gas mixture according to formula (7) below, where 'x' is a predetermined amount of the hydrogen gas mixed with the carbon-based fuel, 0.45 m/s is the assumed laminar flame speed of gasoline in this example and 4.4 m/s is the assumed laminar flame speed of hydrogen in this example:

$$\text{LFS of gasoline-gas mixture} = [(4.4 \times [x\%]) + (0.45 \times [1 - x\%])] \quad (7)$$

As discussed above, the control system 130 is also configured to determine the target hydrogen amount that should be provided to the fuel-gas mixture to maximize the percentage of gasoline consumption in the internal combustion engine 105. The control system 130 may determine the target hydrogen amount based on the formula (8) below, where 'x' represents the target hydrogen amount, 0.45 m/s is the assumed laminar flame speed of gasoline in this example and 4.4 m/s is the assumed laminar flame speed of hydrogen in this example:

$$\% \text{ gasoline combustion with } x \% \text{ H2 gas} = \left[\frac{1}{\text{engine stroke length}}\right] \times [(4.4 \times [x \%]) + (0.45 \times [1 - x \%])] \times \left[\frac{\left(\frac{1 \text{ rotation}}{2 \text{ strokes}}\right)}{\text{engine RPM}}\right] \quad (8)$$

In cases, where the control system 130 is configured to represent the target amount of hydrogen gas to be provided in the fuel-gas mixture to generate a predetermined percentage of fuel combustion, the control system 130 determines the target operation of the reactor 125 and instructs the reactor 125 to operate accordingly. In one example, the control system 130 controls the voltage provided across reactor 125 to generate the target amount of hydrogen gas from the electrolysis process. In another example, the control system 130 controls the current provided to the reactor 125 in order to generate the target amount of hydrogen gas from the electrolysis process. In another example, the control system 130 controls the temperature across the reactor 125. The control system 130 may alternatively control some or all of these parameters, such as voltage, current and temperature of reactor 125, to operate the reactor 125 in a manner such that the electrolysis process carried out by the reactor 125 yields the target amount of hydrogen gas.

By controlling the percentage of fuel combustion in a fuel-gas mixture, the internal combustion engine 105 is configured to reduce the amount of greenhouse gas emissions resulting from fuel combustion. In an example where fuel used in the internal combustion engine 105 is diesel, the control system 130 is configured to control the percent combustion of diesel using formula (6), which may provide the advantages of increasing the fraction of carbon dioxide gas ($CO_2$) versus carbon monoxide (CO) gas generated in the internal combustion engine 105. In some cases, the control system 130 is configured to determine the mass balance of the percentage combustion of diesel calculated in formula (6) based on the following formula (9), where a=[% diesel combustion with x % $H_2$ gas]×12, b=12−a, c=11.5 and z=0.5(2a+b+c):

$$C_{12}H_{23} + zO_2 \rightarrow aCO_2 + bCO + cH_2O \quad (9)$$

Figure 2A:
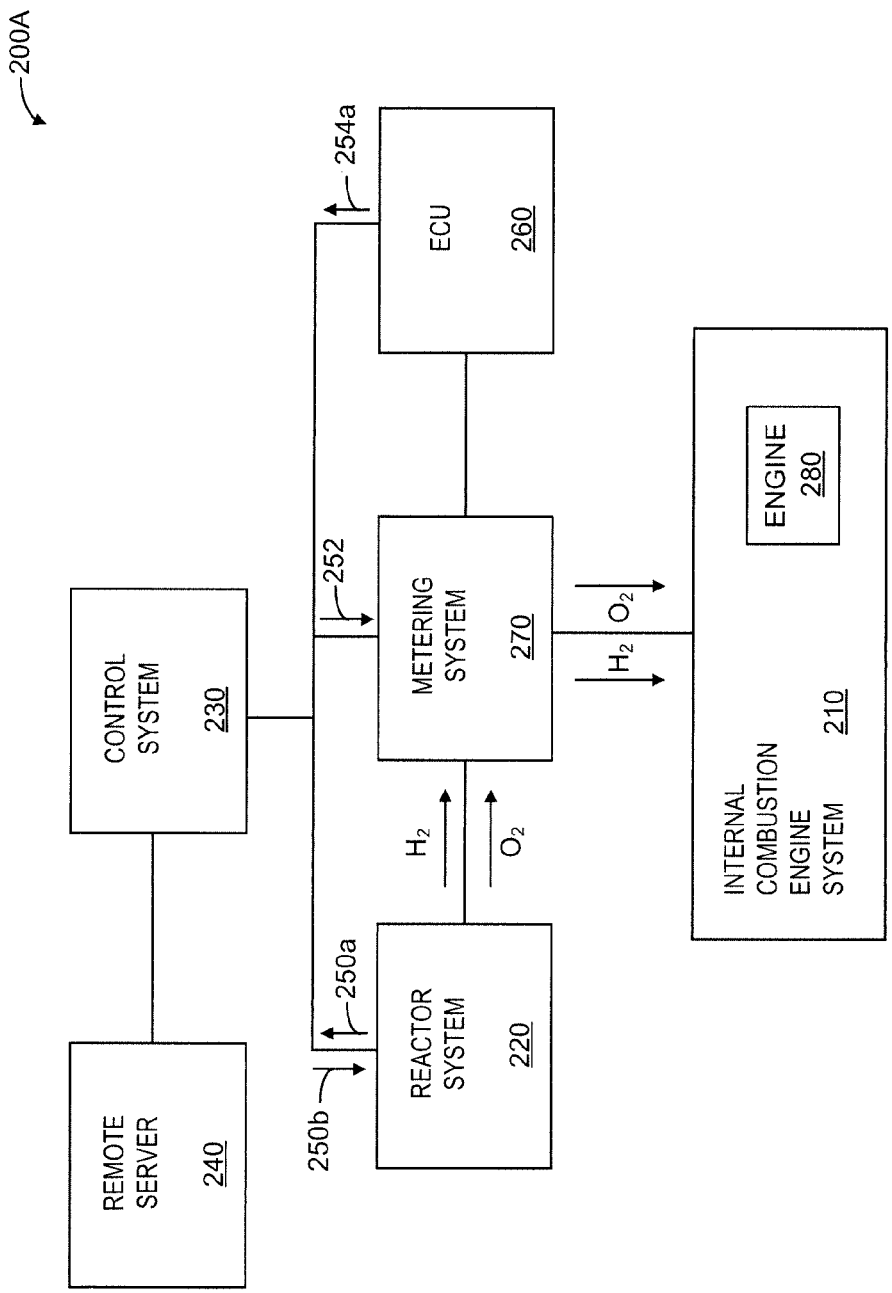
FIG. 2A is another example of a block diagram of a fuel management system.
Figure 2B:
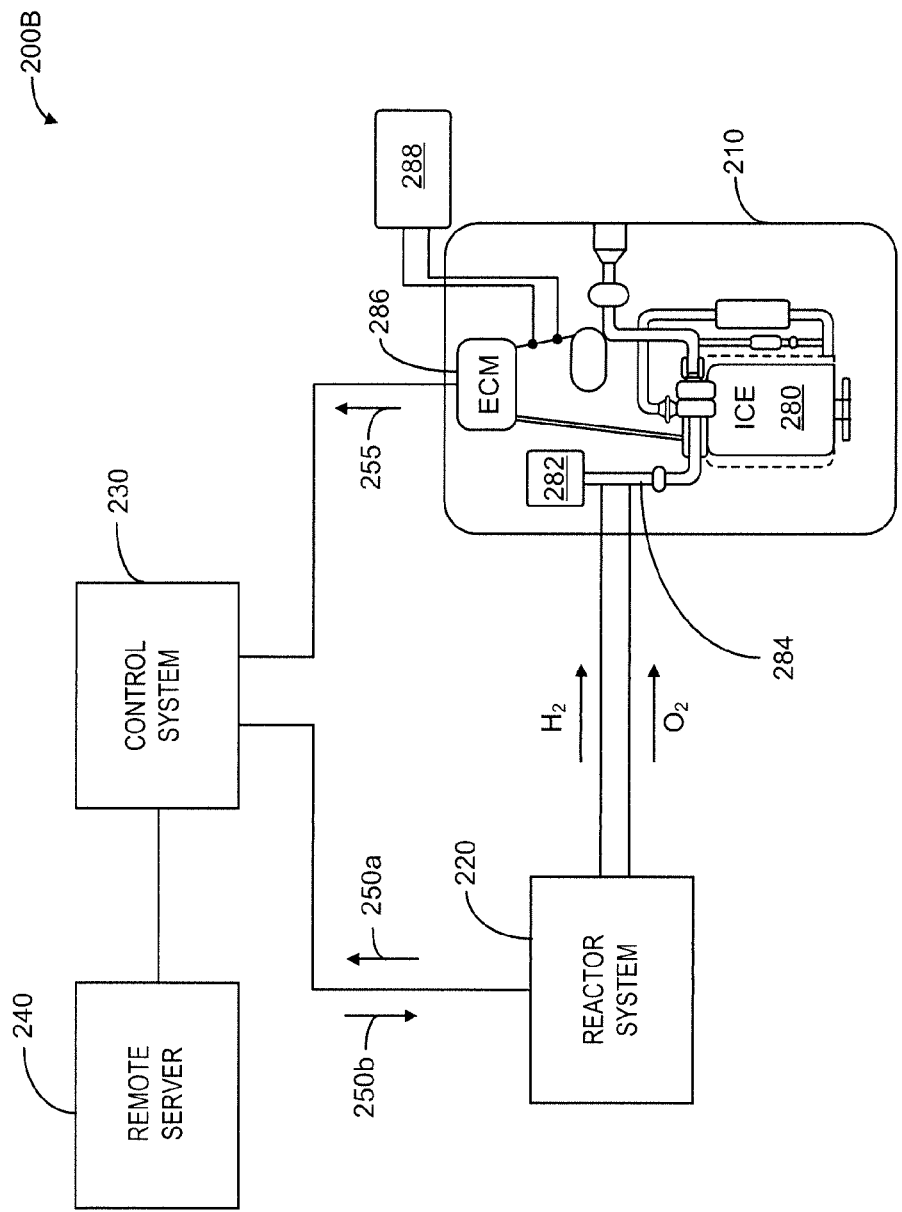
FIG. 2B is a further example of a block diagram of a fuel management system.

Reference is next made to FIGS. 2A and 2B, which illustrate example embodiments of fuel management systems 200A and 200B, respectively. The fuel management system 200A illustrates a block diagram of the various components comprised in the fuel management system 200A according to one example. The fuel management system 200B illustrates the components comprised in the fuel management system 200B according to another example.

Fuel management systems 200A and 200B comprise an internal combustion engine system 210, a reactor system 220, a control system 230 and a remote server 240. In the embodiment of FIG. 2A, the fuel management system 200A comprises a metering system 270. In the embodiment of FIG. 2B, the functionality of metering system 270 is included in the reactor system 220.

In the illustrated embodiment of FIGS. 2A and 2B, the reactor 220 is coupled to a source of pure water or substantially pure water. The reactor 220 is configured to carry out an electrolysis process to generate hydrogen and oxygen gases. In the embodiment of FIG. 2A, the generated hydrogen and oxygen gases are then provided to the metering device 270.

These hydrogen and oxygen gases are then fed from the metering device 270 to the internal combustion engine system 210. More specifically, as illustrated in FIG. 2B, the hydrogen and oxygen gases are fed to the air intake passage 284 of the internal combustion engine 280, either prior to the air filter 282, or after the air filter and preferably prior to the turbo charger (if applicable).

The internal combustion engine system 210 also includes an electronic control module (ECM) 286 for monitoring the operating parameters of the internal combustion engine 280. As discussed herein, the ECM 286 monitors the operating parameters of the internal combustion engine 280, and provides that information to the control system 230, either directly as disclosed in the embodiment of FIG. 2B, or via the ECU 260 as disclosed in the embodiment of FIG. 2A.

In some cases, if the internal combustion engine system 210 is equipped with an exhaust gas recirculation (EGR) system, a signal modification device 288 or an equivalent ECM software changes may be provided to the internal combustion engine system 210 to optimize results. The type of enhancement or software change required will vary according to engine and operation conditions set up and will need to take into account impacts on emissions including particulate matter, hydrocarbons and NOx.

In the illustrated embodiment of FIGS. 2A and 2B, the reactor system transmits a reactor parameter signal 250a to the control system 230, where the reactor parameter signal 250a includes one or more measurements for the operating parameters of the reactor system 220, as discussed above. Some non-limiting examples of operating parameters of the reactor system 220 may include water tank level, electrolyte level, supplied electrical voltage, supplied electrical current, water tank temperature, reactor temperature, reactor leakage, water pump, gas flow, relative humidity, conductivity of electrolyte, resistance of electrolyte, and concentration of electrolyte, among other things.

The operating parameters of the reactor system 220 may be monitored at a predetermined frequency in some cases. In some other cases, the operating parameters of the reactor system 220 may be monitored at the direction of an operator or a user.

In the illustrated embodiments of FIGS. 2A and 2B, the control system 230 transmits a reactor signal 250b to the reactor 220. Reactor signal 250b triggers the reactor 220 to carry out the process of electrolysis to generate the hydrogen and oxygen gases. Reactor signal 250b may additionally include voltage, current and/or temperature values for the reactor system 220 to trigger the reactor system 220 to begin electrolysis.

In the embodiment of FIG. 2A, the reactor system 220 is configured to generate hydrogen and oxygen gases when triggered by the reactor signal 250b from the control system 230. However, the volumes and ratio of the hydrogen and oxygen gases generated by the reactor system 220 may be in excess of the hydrogen and oxygen gases required by the internal combustion engine 280.

In such cases, the generated hydrogen and oxygen gases are provided from the reactor system 220 to the metering system 270, where the hydrogen and oxygen gases are metered at specific ratios and/or volumes by the metering device 270 based on the metering signal 252 received from the control system 230. The metering signal 252 instructs the metering system 270 to extract specific volumes and ratio of the hydrogen and oxygen gases, and provide the metered quantities to the internal combustion engine system 210.

In the embodiment of FIG. 2B, the reactor signal 250b additionally specifies the voltage, current and/or temperature settings at which the reactor system 220 should operate in order to generate predetermined volumes and ratio of the hydrogen and oxygen gases to be provided to the internal combustion engine system 210.

In addition, as illustrated in FIGS. 2A and 2B, the engine parameters as discussed above are transmitted from the internal combustion engine system 210 to the control system 230, either via ECM 286 directly as shown in FIG. 2B, or via ECU 260 directly as shown in FIG. 2A, or via a combination of both. As shown, in FIG. 2A, the operating parameters of the internal combustion engine system 210 are monitored by the ECU 260, and one or more of the monitored operating parameters are provided to the control system 230 via engine parameter signal 254a. In the embodiment of FIG. 2B, the operating parameters of the internal combustion engine system 210 are monitored by the ECM 286 and directly provided to the control system 230 via engine parameter signal 255.

The control system 230 receives engine parameters directly or indirectly from the internal combustion engine system 210 and determines the volumes and ratio of hydrogen and oxygen gases to be provided to the internal combustion engine system 210. In some cases, the control system 230 uses logical regression analysis of one or more engine parameters or other statistical methods to determine volumes and ratio of hydrogen and oxygen gases.

In the various embodiments illustrated herein, the control system 230 is configured to determine a target laminar speed of the mixture of the hydrogen and oxygen gases with the fuel in the internal combustion engine system 210. The target laminar speed is determined to facilitate enhanced fuel burning, and accordingly reduced greenhouse gas emissions. In some cases, the amount of greenhouse gas emissions generated by a combustion engine, such as the internal combustion engine 280 or internal combustion engine system 210, may be regulated. In such cases, the target laminar speed is determined based on such regulations. In some other cases, the target laminar speed is provided by an operator or a user of the fuel management system.

The control system 230 is configured to determine the volumes of hydrogen and oxygen gasses to be generated based on the target laminar speed. The control system 230 is configured to use the above-noted formula (3) to determine the relationship between the percentage of fuel combustion in the internal combustion engine 280 and the percentage of the hydrogen gas in the fuel-gas mixture provided to the internal combustion engine 280. By increasing the percentage of the hydrogen gas in the mixture, the laminar speed of the mixture is increased, and accordingly the percentage combustion of the fuel (in an oxygen-enriched environment) is increased. This may provide the advantages of reduced greenhouse gas emissions and reduced requirement for overall fuel consumption.

Figure 3A:
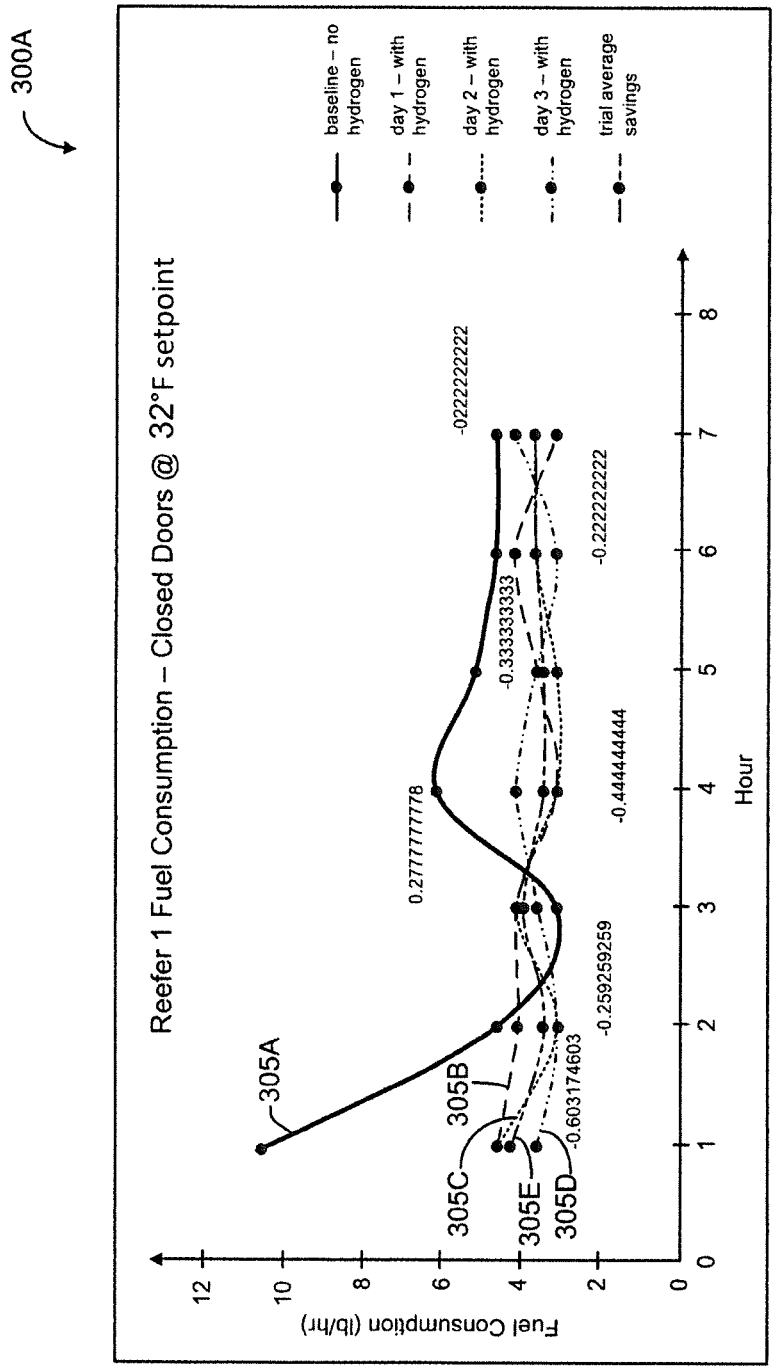
FIG. 3A is an example of a graphical representation of fuel consumption by an internal combustion engine as a function of time.
Figure 3B:
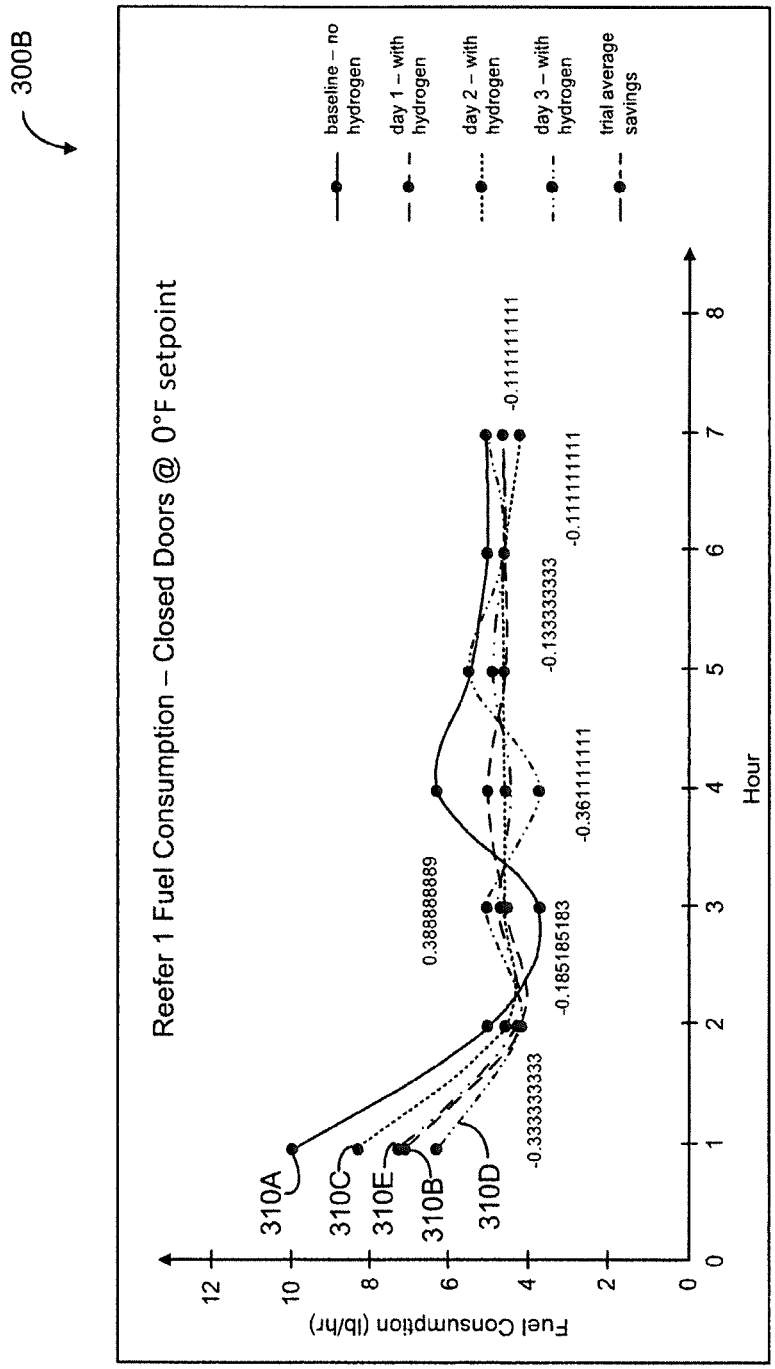
FIG. 3B is another example of a graphical representation of fuel consumption by an internal combustion engine as a function of time.
Figure 3C:
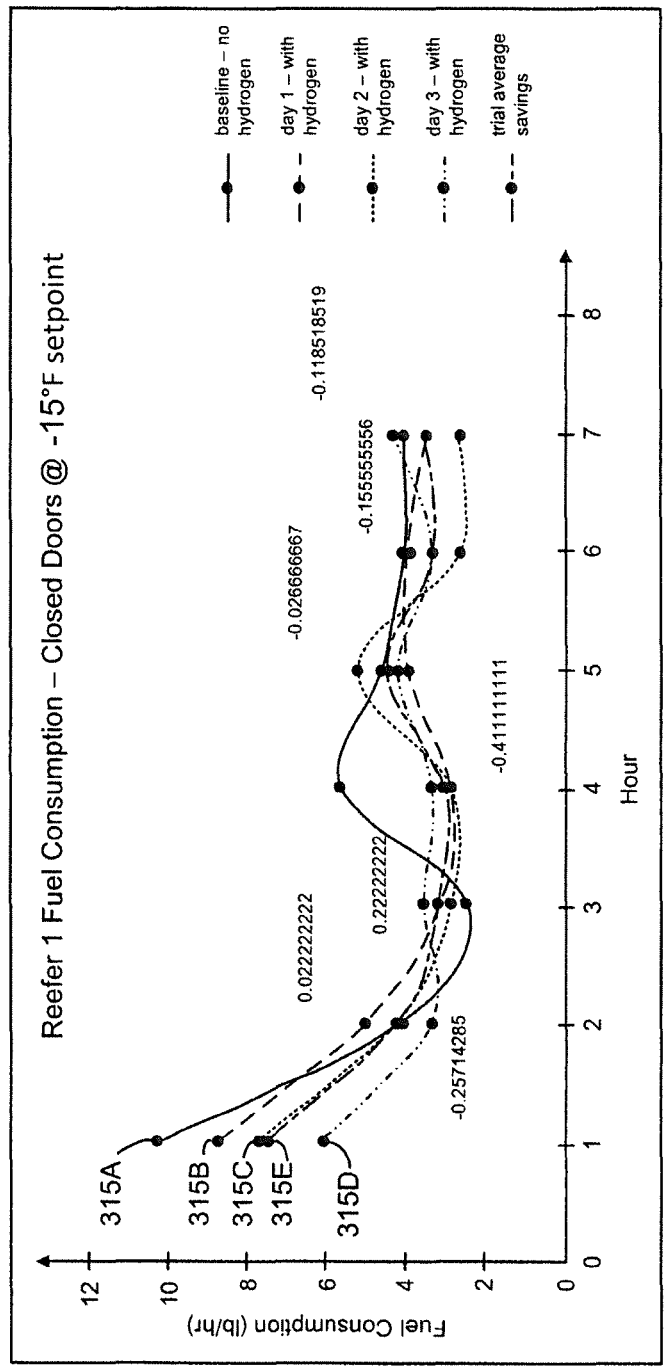
FIG. 3C is a further example of a graphical representation of fuel consumption by an internal combustion engine as a function of time.

Reference is next made to FIGS. 3A, 3B and 3C, which illustrate graphical representations of fuel consumption by an internal combustion engine, such as engine 105 of FIG. 1, at different temperatures of engine operation. The internal combustion engine of FIGS. 3A, 3B and 3C is a refrigerated trailer engine, which operates with the objective of maintaining a set temperature inside the trailer. For example, if the trailer is set to 32 degrees Fahrenheit (32° F.), which corresponds to 0 degrees Celsius, the engine operates in high gear until the temperature reaches 32° F. (0° C.), at which point it drops into low gear. Then, for the rest of the day, during the course of operation, the engine alternates between high and low gears as needed to stay at 32° F. (0° C.). As a result, the fuel consumption varies slightly from day to day based on external factors, such as outside temperature.

FIG. 3A illustrates a graphical representation 300A of fuel consumption by an internal combustion engine as a function of time at a target engine temperature of 32° F. (0° C.). FIG. 36 illustrates a graphical representation 3008 of fuel consumption by an internal combustion engine as a function of time at a target engine temperature of 0° F. (about −18° C.), FIG. 30 illustrates a graphical representation 3000 of fuel consumption by an internal combustion engine as a function of time at a target engine temperature of −15° F. (about −26° C.).

As illustrated in FIG. 3A, graph 305A illustrates the amount of fuel consumption in a scenario where no hydrogen is introduced into the engine. Over the course of hours 1 to 7, the amount of fuel consumed by the engine varies greatly, resulting in a high overall fuel consumption and high amounts of greenhouse gas emissions.

Graphs 305B-305D illustrate the amount of fuel consumption by the engine over a course of three day trial. Over the course of the trial, a predetermined amount of hydrogen, determined by a control system (such as the control system 130 of FIG. 1) based on formula (2) discussed above, is introduced into the engine at more or less a consistent rate. Graph 305B illustrates the amount of fuel consumed by the engine on the first day of a three day trial. Graph 305C illustrates the amount of fuel consumed by the engine on the second day of a three day trial. Graph 305D illustrates the amount of fuel consumed by the engine on the third day of a three day trial.

Graph 305E illustrates an average of the amount of fuel consumed by the engine over the course of the three day trial. As shown, the amount of fuel consumption in scenarios where the predetermined amount of hydrogen was mixed with the fuel before combustion, as illustrated in FIGS. 305B-305D and particularly FIG. 305E, is much lower than the scenario where no hydrogen was mixed with the fuel.

Reference is next made to FIG. 3B, where graph 310A illustrates the amount of fuel consumption in a scenario where no hydrogen is introduced into the engine. Graphs 310B-310D illustrate the amount of fuel consumption by the engine over a course of three day trial, where graph 310B illustrates the amount of fuel consumed by the engine on the first day, graph 310C illustrates the amount of fuel consumed by the engine on the second day and graph 310D illustrates the amount of fuel consumed by the engine on the third day of a three day trial.

Graph 310E illustrates an average of the amount of fuel consumed by the engine over the course of the three day trial. As shown, the amount of fuel consumption in scenarios where the predetermined amount of hydrogen was mixed with the fuel before combustion, as illustrated in FIGS. 310B-310D and particularly FIG. 310E, is much lower than the scenario where no hydrogen was mixed with the fuel, as illustrated in FIG. 310A.

Reference is next made to FIG. 3C, where graph 315A illustrates the amount of fuel consumption in a scenario where no hydrogen is introduced into the engine. Graphs 315B—315D illustrate the amount of fuel consumption by the engine over a course of three day trial, where graph 315B illustrates the amount of fuel consumed by the engine on the first day, graph 315C illustrates the amount of fuel consumed by the engine on the second day and graph 315D illustrates the amount of fuel consumed by the engine on the third day of a three day trial.

Graph 315E illustrates an average of the amount of fuel consumed by the engine over the course of the three day trial. As shown, the amount of fuel consumption in scenarios where the predetermined amount of hydrogen was mixed with the fuel before combustion, as illustrated in FIGS. 315B-315D and particularly FIG. 315E, is much lower than the scenario where no hydrogen was mixed with the fuel, as illustrated in FIG. 315A.

Numerous specific details are set forth herein in order to provide a thorough understanding of the exemplary embodiments described herein. However, it will be understood by those of ordinary skill in the art that these embodiments may be practiced without these specific details. In other instances, well-known methods, procedures and components have not been described in detail so as not to obscure the description of the embodiments. Furthermore, this description is not to be considered as limiting the scope of these embodiments in any way, but rather as merely describing the implementation of these various embodiments.

The invention claimed is:

1. A fuel management system comprising:
an internal combustion engine configured to combust a carbon-based fuel supplied by a fuel supply;
a reactor system configured to electrolytically disassociate a substrate to generate hydrogen gas and oxygen gas, the hydrogen gas and the oxygen gas being provided to the internal combustion engine prior to the combustion of the carbon-based fuel via an air intake passage; and
a control system coupled to the reactor system and the internal combustion engine, the control system being configured to control a percentage of combustion of the carbon-based fuel in a fuel-gas mixture comprising the carbon-based fuel, the hydrogen gas and the oxygen gas based on a laminar flame speed of the fuel-gas mixture, where the percentage combustion of the carbon-based fuel is correlated to the laminar flame speed of the fuel-gas mixture according to:

% fuel combustion with $x$ % H2 gas =

$$\frac{\text{laminar flame speed of the fuel-gas mixture}}{\text{engine stroke speed}},$$

wherein engine stroke speed = $\dfrac{\text{engine stroke length}}{\left(\dfrac{1 \text{ rotation}}{2 \text{ strokes}}\right)}$, and
engine RPM wherein the engine stroke length is a length of a piston stroke of the internal combustion engine, the control system being configured to control the percentage of combustion of the carbon-based fuel by modifying at least one of electrical current supplied to the reactor system, electrical voltage supplied to the reactor system, and temperature of the reactor system.

2. The fuel management system of claim 1, wherein the control system is configured to determine the laminar flame speed of the fuel-gas mixture according to:

laminar flame speed of fuel-gas mixture=$[(z\times[x\%])+(y\times[1-x\%])]$, wherein x is a predetermined amount of the hydrogen gas mixed with the carbon-based fuel, y is a laminar flame speed of the carbon-based fuel (in m/s) and z is a laminar flame speed of hydrogen gas (in m/s).

3. The fuel management system of claim 2, wherein the carbon-based fuel is diesel, and the control system is configured to determine the laminar flame speed of the diesel-gas mixture according to:

laminar flame speed of diesel-gas mixture=$[(4.4\times[x\%])+(*0.3\times[1-x\%])]$, wherein x is a predetermined amount of the hydrogen gas mixed with the carbon-based fuel, the laminar flame speed of diesel is 0.3 m/s and the laminar flame speed of hydrogen gas is 4.4 m/s.

4. The fuel management system of claim 2, wherein the carbon-based fuel is gasoline, and the control system is configured to determine the laminar flame speed of the gasoline-gas mixture according to:

laminar flame speed of gasoline-gas mixture=
$[(4.4\times[x\%])+(0.45\times[1-x\%])]$, wherein x is a predetermined amount of the hydrogen gas mixed with the carbon-based fuel, the laminar flame speed of gasoline is 0.45 m/s and the laminar flame speed of hydrogen gas is 4.4 m/s.

5. The fuel management system of claim 1, wherein the control system is configured to determine a percentage of combustion of the carbon-based fuel in the fuel-gas mixture according to:

% fuel combustion with $x$% H2 gas =

$$\left[\frac{1}{\text{engine stroke length}}\right]\times[(z\times[x\%])+(y\times[1-x\%])]\times\left[\frac{\left(\dfrac{1\text{ rotation}}{2\text{ strokes}}\right)}{\text{engine RPM}}\right],$$

wherein x is a predetermined amount of the hydrogen gas mixed with the carbon-based fuel, y is a laminar flame speed of the carbon-based fuel (in m/s) and z is a laminar flame speed of hydrogen gas (in m/s).

6. The fuel management system of claim 5, wherein the carbon-based fuel is diesel, and the control system is configured to determine the percentage of combustion of diesel in the diesel-gas mixture according to:

% diesel combustion with $x$ % H2 gas = $\left[\dfrac{1}{\text{engine stroke length}}\right]\times$ $$[(4.4\times[x\%])+(0.3\times[1-x\%])]\times\left[\frac{\left(\dfrac{1\text{ rotation}}{2\text{ strokes}}\right)}{\text{engine RPM}}\right],$$

wherein x is a predetermined amount of the hydrogen gas mixed with the carbon-based fuel, the laminar flame speed of diesel is 0.3 m/s and the laminar flame speed of hydrogen gas is 4.4 m/s.

7. The fuel management system of claim 6, wherein the control system is configured to determine a mass balance for the percentage combustion of the carbon-based fuel according to:

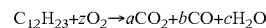
$C_{12}H_{23}+zO_2 \rightarrow aCO_2+bCO+cH_2O$ wherein:
a=[% diesel combustion with x % H2 gas]×12;
b=12−a;
c=11.5; and
z=0.5(2a+b+c).

8. The fuel management system of claim 7, wherein the carbon-based fuel is diesel, and wherein the control system is configured to determine the percentage of combustion of diesel in a mixture comprising the diesel, the hydrogen gas and the oxygen gas according to:

% diesel combustion with $x$% H2 gas = $\left[\dfrac{1}{\text{engine stroke length}}\right]\times$ $$[(4.4\times[x\%])+(0.3\times[1-x\%])]\times\left[\frac{\left(\dfrac{1\text{ rotation}}{2\text{ strokes}}\right)}{\text{engine RPM}}\right],$$

wherein x is a predetermined amount of the hydrogen gas mixed with the carbon-based fuel in the mixture, the laminar flame speed of diesel is 0.3 m/s, the laminar flame speed of hydrogen gas is 4.4 m/s and engine stroke length is a length of a piston stroke of the internal combustion engine.

9. The fuel management system of claim 7, wherein the carbon-based fuel is gasoline, and wherein the control system is configured to determine the percentage of combustion of gasoline in a mixture comprising the gasoline-based fuel, the hydrogen gas and the oxygen gas according to:

% gasoline combustion with $x$ % H2 gas = $\left[\dfrac{1}{\text{engine stroke length}}\right]\times$ $$[(4.4\times[x\%])+(0.45\times[1-x\%])]\times\left[\frac{\left(\dfrac{1\text{ rotation}}{2\text{ strokes}}\right)}{\text{engine RPM}}\right],$$

wherein x is a predetermined amount of the hydrogen gas mixed with the carbon-based fuel in the mixture, the laminar flame speed of gasoline is 0.45 m/s, the laminar flame speed of hydrogen gas is 4.4 m/s and engine stroke length is a length of a piston stroke of the internal combustion engine.

10. The fuel management system of claim 5, wherein the carbon-based fuel is gasoline, and the control system is configured to determine the percentage of combustion of gasoline fuel in the gasoline-gas mixture according to:

$$\% \text{ gasoline combustion with } x\% \text{ H2 gas} = \left[\frac{1}{\text{engine stroke length}}\right] \times [(4.4 \times [x\ \%]) + (0.45 \times [1 - x\%])] \times \left[\frac{\left(\frac{1 \text{ rotation}}{2 \text{ strokes}}\right)}{\text{engine RPM}}\right],$$

wherein x is a predetermined amount of the hydrogen gas mixed with the carbon-based fuel, the laminar flame speed of gasoline is 0.45 m/s and the laminar flame speed of hydrogen gas is 4.4 m/s.

11. A fuel management system comprising:
an internal combustion engine configured to combust a carbon-based fuel supplied by a fuel supply;
a reactor system configured to electrolytically disassociate a substrate to generate hydrogen gas and oxygen gas, the hydrogen gas and the oxygen gas being provided to the internal combustion engine prior to the combustion of the carbon-based fuel via an air intake passage; and
a control system coupled to the reactor system and the internal combustion engine, the control system being configured to determine a percentage of combustion of the carbon-based fuel in a mixture comprising the carbon-based fuel, the hydrogen gas and the oxygen gas according to:

$$\% \text{ fuel combustion with } x\ \% \text{ H2 gas} = \left[\frac{1}{\text{engine stroke length}}\right] \times [(z \times [x\ \%]) + (y \times [1 - x\ \%])] \times \left[\frac{\left(\frac{1 \text{ rotation}}{2 \text{ strokes}}\right)}{\text{engine RPM}}\right],$$

wherein x is a predetermined amount of the hydrogen gas mixed with the carbon-based fuel in the mixture, y is a laminar flame speed of the carbon-based fuel (in m/s), z is a laminar flame speed of hydrogen gas (in m/s) and engine stroke length is a length of a piston stroke of the internal combustion engine,
the control system being configured to control the percentage of combustion of the carbon-based fuel by modifying at least one of electrical current supplied to the reactor system, electrical voltage supplied to the reactor system, and temperature of the reactor system.

12. A method of operating a fuel management system, the fuel management system comprising an internal combustion engine configured to combust a carbon-based fuel supplied by a fuel supply, the fuel management system also comprising a reactor system configured to electrolytically disassociate a substrate to generate hydrogen gas and oxygen gas, the hydrogen gas and the oxygen gas being provided to the internal combustion engine prior to the combustion of the carbon-based fuel via an air intake passage, and the fuel management system additionally comprising a control system coupled to the internal combustion engine and the reactor system, the control system including a processor and a memory coupled to the processor and configured to store instructions executable by the processor, the method comprising:

receiving a predetermined percentage of hydrogen gas value at the processor, the predetermined percentage of hydrogen gas value representing a percentage of hydrogen gas in a fuel-gas mixture of the carbon-based fuel, hydrogen gas and the oxygen gas provided to the internal combustion engine for combustion; and determining, by the processor, a percentage of combustion of the carbon-based fuel in the fuel-gas mixture, wherein the percentage combustion of the carbon-based fuel is correlated to the laminar flame speed of the fuel-gas mixture according to:

$$\% \text{ diesel combustion with } x\ \% \text{ H2 gas} = \frac{\text{laminar flame speed of the fuel-gas mixture}}{\text{engine stroke speed}},$$

$$\text{wherein engine stroke speed} = \frac{\text{engine stroke length}}{\frac{\left(\frac{1 \text{ rotation}}{2 \text{ strokes}}\right)}{\text{engine RPM}}},$$

wherein the engine stroke length is a length of a piston stroke of the internal combustion engine, and modifying at least one of electrical current supplied to the reactor system, electrical voltage supplied to the reactor system, and temperature of the reactor system to control the percentage of combustion of the carbon-based fuel.

13. The method of claim 12, further comprising:
determining, by the processor, the laminar flame speed of the fuel-gas mixture according to:

laminar flame speed of fuel-gas mixture=$[(a+[x\ \%])+(y\times[1-x\ \%])]$, wherein x is a predetermined amount of the hydrogen gas mixed with the carbon-based fuel, y is a laminar flame speed of the carbon-based fuel (in m/s) and z is a laminar flame speed of hydrogen gas (in m/s).

14. The method of claim 12, further comprising:
determining, by the processor, a percentage of combustion of the carbon-based fuel in the fuel-gas mixture according to:

$$\% \text{ fuel combustion with } x\ \% \text{ H2 gas} = \left[\frac{1}{\text{engine stroke length}}\right] \times [(z \times [x\ \%]) + (y \times [1 - x\ \%])] \times \left[\frac{\left(\frac{1 \text{ rotation}}{2 \text{ strokes}}\right)}{\text{engine RPM}}\right],$$

wherein x is a predetermined amount of the hydrogen gas mixed with the carbon-based fuel, y is a laminar flame speed of the carbon-based fuel (in m/s) and z is a laminar flame speed of hydrogen gas (in m/s).

15. The method of claim 14, wherein the carbon-based fuel is diesel, and the method comprises determining, by the processor, the percentage of combustion of diesel in a mixture comprising the diesel, the hydrogen gas and the oxygen gas according to:

$$\% \text{ diesel combustion with } x \% \text{ H2 gas} = \left[\frac{1}{\text{engine stroke length}}\right] \times$$

$$[(4.4 \times [x \%]) + (0.3 \times [1 - x \%])] \times \left[\frac{\left(\frac{1 \text{ rotation}}{2 \text{ strokes}}\right)}{\text{engine RPM}}\right],$$

wherein x is a predetermined amount of the hydrogen gas mixed with the carbon-based fuel in the mixture, the laminar flame speed of diesel is 0.3 m/s, the laminar flame speed of hydrogen gas is 4.4 m/s and engine stroke length is a length of a piston stroke of the internal combustion engine.

16. The method of claim 14, wherein the carbon-based fuel is gasoline, and the method comprises determining, by the processor, the percentage of combustion of gasoline in a mixture comprising the gasoline-based fuel, the hydrogen gas and the oxygen gas according to:

$$\% \text{ gasoline combustion with } x \% \text{ H2 gas} = \left[\frac{1}{\text{engine stroke length}}\right] \times$$

$$[(4.4 \times [x \%]) + (0.45 \times [1 - x \%])] \times \left[\frac{\left(\frac{1 \text{ rotation}}{2 \text{ strokes}}\right)}{\text{engine RPM}}\right],$$

wherein x is a predetermined amount of the hydrogen gas mixed with the carbon-based fuel in the mixture, the laminar flame speed of gasoline is 0.45 m/s, the laminar flame speed of hydrogen gas is 4.4 m/s and engine stroke length is a length of a piston stroke of the internal combustion engine.

17. The method of claim 14, wherein the carbon-based fuel is diesel, and the method comprises determining, by the processor, the percentage of combustion of diesel in the diesel-gas mixture according to:

$$\% \text{ diesel combustion with } x \% \text{ H2 gas} = \left[\frac{1}{\text{engine stroke length}}\right] \times$$

$$[(4.4 \times [x \%]) + (0.3 \times [1 - x \%])] \times \left[\frac{\left(\frac{1 \text{ rotation}}{2 \text{ strokes}}\right)}{\text{engine RPM}}\right],$$

wherein x is a predetermined amount of the hydrogen gas mixed with the carbon-based fuel in the mixture, the laminar flame speed of diesel is 0.3 m/s and the laminar flame speed of hydrogen gas is 4.4 m/s.

18. The method of claim 17, further comprising:
determining, by the processor, a mass balance for the percentage combustion of the carbon-based fuel according to:

wherein:
a=[% diesel combustion with x % H2 gas]×12;
b=12−a;
c=11.5; and
z=0.5(2a+b+c).

19. The method of claim 14, wherein the carbon-based fuel is gasoline, and the method comprises determining, by the processor, the percentage of combustion of gasoline in the gasoline-gas mixture according to:

$$\% \text{ gasoline combustion with } x \% \text{ H2 gas} = \left[\frac{1}{\text{engine stroke length}}\right] \times$$

$$[(4.4 \times [x \%]) + (0.45 \times [1 - x \%])] \times \left[\frac{\left(\frac{1 \text{ rotation}}{2 \text{ strokes}}\right)}{\text{engine RPM}}\right]$$

wherein x is a predetermined amount of the hydrogen gas mixed with the carbon-based fuel in the mixture, the laminar flame speed of gasoline is 0.45 m/s and the laminar flame speed of hydrogen gas is 4.4 m/s.

20. A method of operating a fuel management system, the fuel management system comprising an internal combustion engine configured to combust a carbon-based fuel supplied by a fuel supply, the fuel management system also comprising a reactor system configured to electrolytically disassociate a substrate to generate hydrogen gas and oxygen gas, the hydrogen gas and the oxygen gas being provided to the internal combustion engine prior to the combustion of the carbon-based fuel via an air intake passage, and the fuel management system additionally comprising a control system coupled to the internal combustion engine and the reactor system, the control system including a processor and a memory coupled to the processor and configured to store instructions executable by the processor, the method comprising:

receiving a predetermined percentage of hydrogen gas value at the processor, the predetermined percentage of hydrogen gas value representing a percentage of hydrogen gas in a fuel-gas mixture of the carbon-based fuel, hydrogen gas and the oxygen gas provided to the internal combustion engine for combustion;

determining, by the processor, a percentage of combustion of the carbon-based fuel in the fuel-gas mixture according to:

$$\% \text{ fuel combustion with } x \% \text{ H2 gas} =$$

$$\left[\frac{1}{\text{engine stroke length}}\right] \times [(z \times [x \%]) + (y \times [1 - x \%])] \times \left[\frac{\left(\frac{1 \text{ rotation}}{2 \text{ strokes}}\right)}{\text{engine RPM}}\right],$$

wherein x is a predetermined amount of the hydrogen gas mixed with the carbon-based fuel in the mixture, y is a laminar flame speed of the carbon-based fuel (in m/s), z is a laminar flame speed of hydrogen gas (in m/s) and engine stroke length is a length of a piston stroke of the internal combustion engine, and modifying at least one of electrical current supplied to the reactor system, electrical voltage supplied to the reactor system, and temperature of the reactor system to control the percentage of combustion of the carbon-based fuel.

* * * * *